Figure 1:
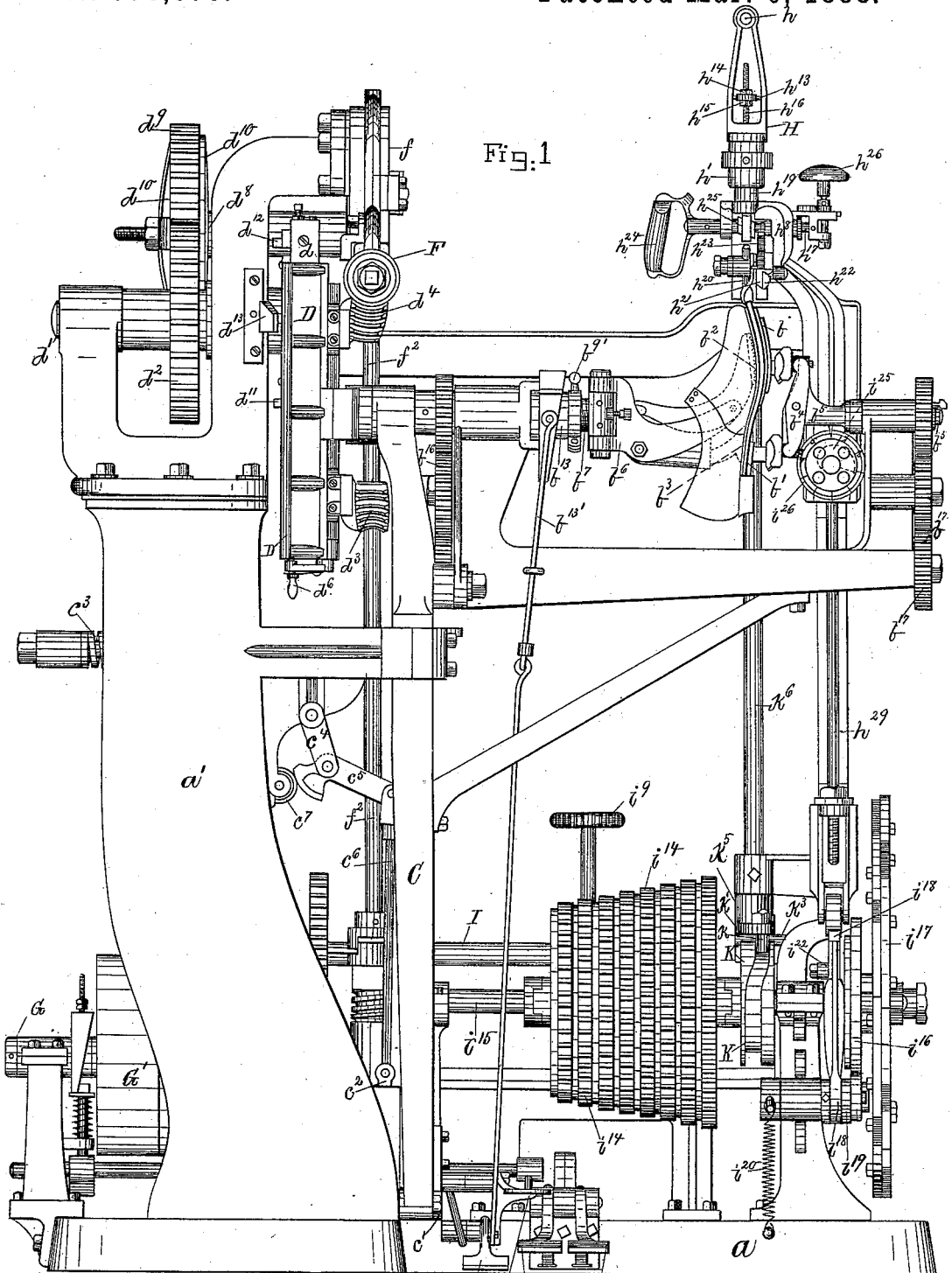

(No Model.) 6 Sheets—Sheet 2.

F. W. COY & G. A. FULLERTON.
MACHINE FOR TRIMMING SOLE EDGES.

No. 378,870. Patented Mar. 6, 1888.

Witnesses.
G. B. Maynadier.
John R. Snow.

Inventors.
Fredk. W. Coy and
George A. Fullerton
by their attorney
J. E. Maynadier (No Model.) 6 Sheets—Sheet 3.

F. W. COY & G. A. FULLERTON.
MACHINE FOR TRIMMING SOLE EDGES.

No. 378,870. Patented Mar. 6, 1888.

Witnesses.
G. B. Magnadier
John R. Snow

Inventors.
Fredk. W. Coy and
George A. Fullerton
by their attorney,
J. L. Magnadier (No Model.) 6 Sheets—Sheet 4.
F. W. COY & G. A. FULLERTON.
MACHINE FOR TRIMMING SOLE EDGES.
No. 378,870. Patented Mar. 6, 1888.
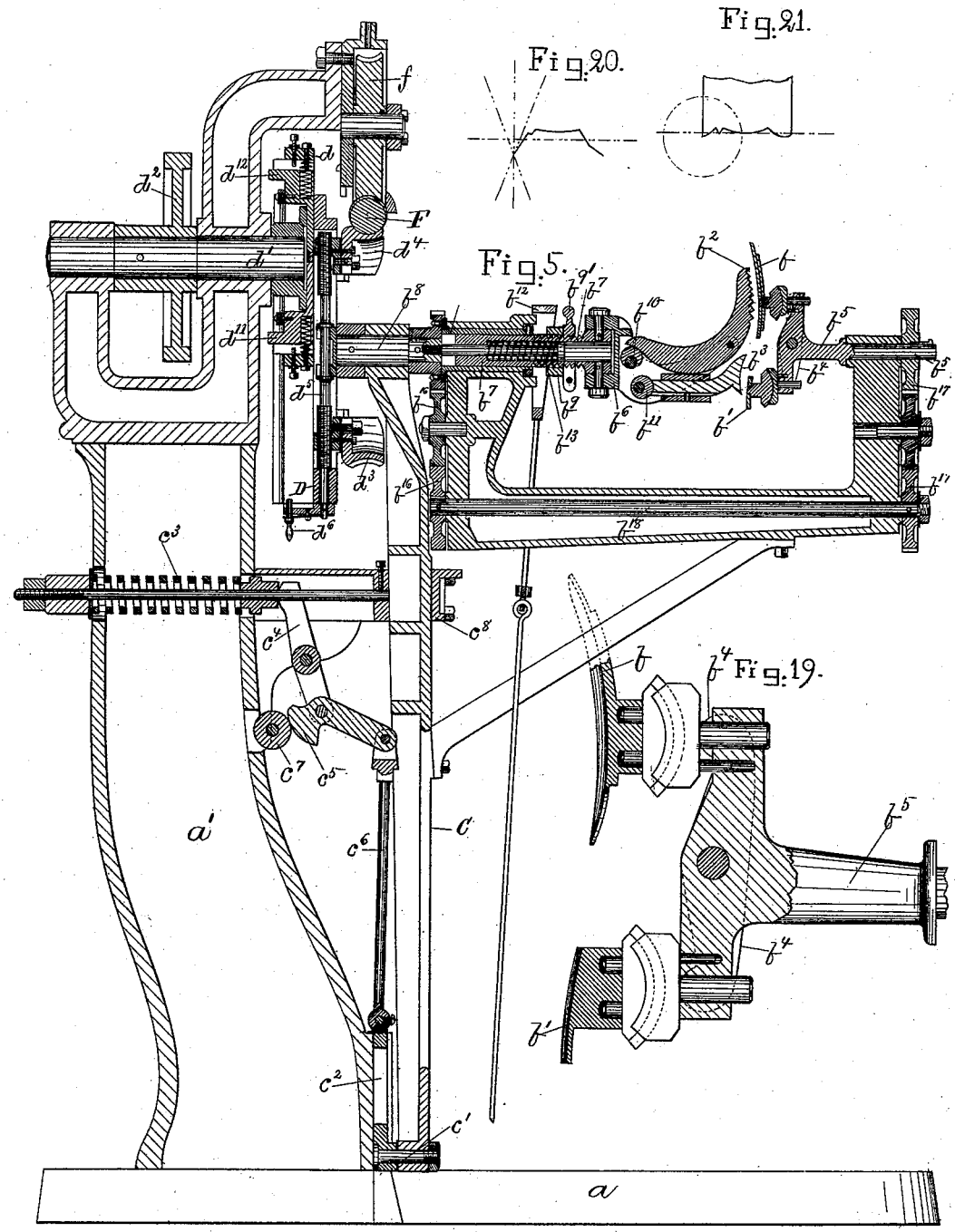
Witnesses.
G. B. Maynadier
John R. Snow.
Inventors.
Fredk. W. Coy and
Geo. A. Fullerton
By their attorney,
J. E. Maynadier

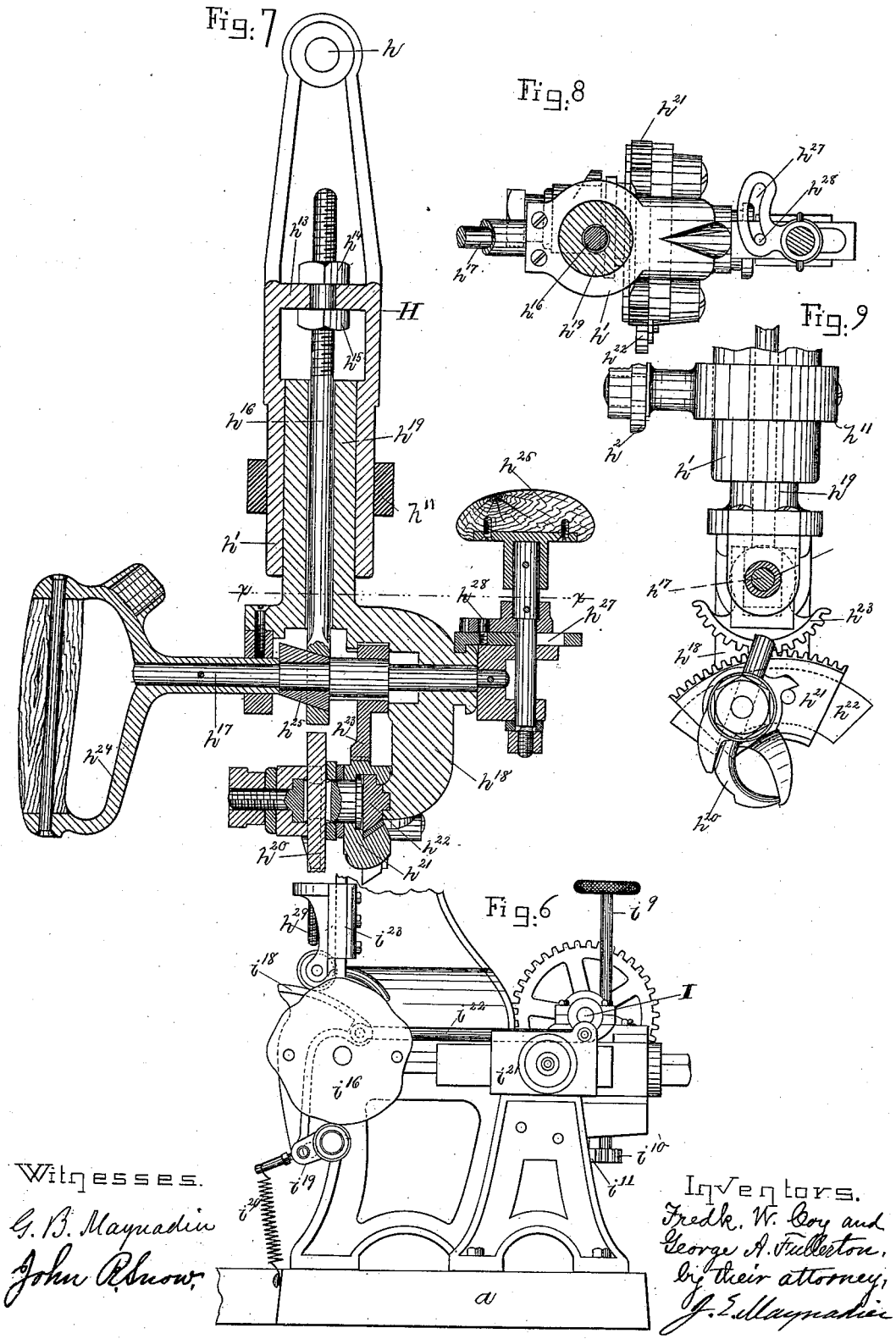

(No Model.) 6 Sheets—Sheet 6.
F. W. COY & G. A. FULLERTON.
MACHINE FOR TRIMMING SOLE EDGES.
No. 378,870. Patented Mar. 6, 1888.
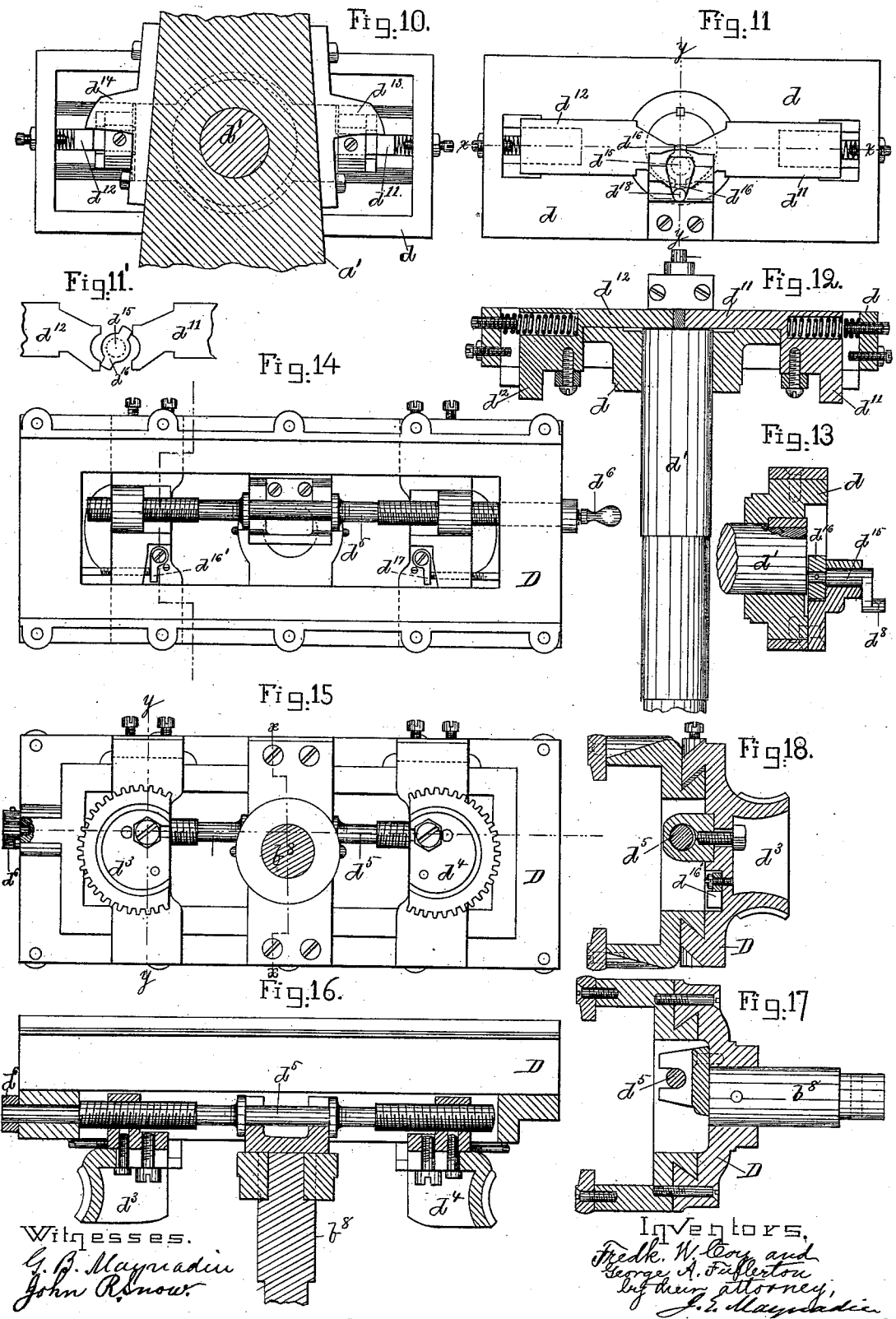
Witnesses.
G. R. Maynadier
John R. Snow.
Inventors,
Fredk. W. Coy and
George A. Fullerton
by their attorney,
J. E. Maynadier

UNITED STATES PATENT OFFICE.

FREDERICK W. COY AND GEORGE A. FULLERTON, OF BOSTON, MASSACHUSETTS, ASSIGNORS TO THE CHAMPION TRIMMER COMPANY, OF NEW HAMPSHIRE.

MACHINE FOR TRIMMING SOLE-EDGES.

SPECIFICATION forming part of Letters Patent No. 378,870, dated March 6, 1888.

Application filed December 20, 1883. Serial No. 115,136. (No model.)

*To all whom it may concern:*

Be it known that we, FREDERICK W. COY and GEORGE A. FULLERTON, both of Boston, in the county of Suffolk and State of Massachusetts, have invented a new and useful Machine for Trimming Sole-Edges, of which the following is a specification.

Our machine consists of the following main parts:

First. A jack or clamp to hold the shoe firmly, including means for clamping and unclamping.

Second. A jack-carriage and means for moving it alternately endwise and half-round.

Three. Devices for insuring smoothness and regularity in the motions of the jack and its carriage. These devices are the gears and their shafts by which the two members of the clamp are caused to move together on their common axis and the frame for supporting these gears and shafts, a sliding frame journaled to the wrist of the jack-carriage and mounted in ways on the main frame of the machine to compel each point in the jack and its carriage to move always in the same vertical plane, a counterbalancing-spring and its connections to ease the motion of this sliding frame and the jack and its carriage.

Fourth. A knife-holder so mounted that while the knife can be moved bodily up and down and sidewise it is held against the motion of the edge past it, and can also be moved on axes to suit the varying bevels of the sole-edge and to cause the knife-blade to always present its edge to the best advantage for cutting as it trims the varying curves of the sole-edge, and also to keep the cutting-edge in proper relation with the sole-edge crosswise. These axes for a straight knife, or a knife for trimming a plane edge, should be the first at the contact of the rand-guide with the sole-edge, the second coincident with the cutting-edge, and the third is unnecessary in a straight-edge knife unless it has a rand-lip, (which is that inclined part of the cutting-edge which takes out the rand, sometimes called a "welt-knife" or "rand-knife" when made separate, but commonly called the "rand-lip," when a part of the knife,) and in that case the axis is best made at right angles with the flat part of the sole-edge and intersecting the other two axes. In knives for trimming fancy edges the first axis on which the knife is tilted to suit the variations in bevel of the sole-edge should be, as before described, parallel with the rand curve of the sole-edge and on the line of contact between the rand-guide and sole. The second axis on which the knife is tipped to keep the blade in the line of cut—that is, to keep the cutting-edge presented to the best advantage for cutting—can no longer be coincident with the cutting-edge, for that is an irregular edge. Consequently whatever line be taken for this axis many points of the irregular or fancy cutting edge must describe arcs of circles whenever the knife is tipped on that axis. The best axis therefore is that by which the arcs are reduced to the lowest average. This will be clear from the diagrams, Figs. 20 and 21, in which Fig. 20 is an edge view of one form of fancy-edged knife, and Fig. 21 a plan of the same knife. The dotted lines in these figures represent planes whose line of intersection represents the best axis, because the knife can be tipped on this axis with the least motion on the average of its cutting-edge in relation to the sole-edge. The third axis—that on which the knife is swung to keep its cutting-edge in proper relation crosswise with the sole-edge—is at right angles substantially with the other two axes, and should intersect the dotted line in Fig. 21. It is preferable, on the whole, that it should intersect this line at or near the rand-lip, as the motion of the knife-holder on this axis is limited by the rand-guide.

Fifth. Automatic means for determining the form of the sole by giving the proper up and down motions to the knife—that is, by compelling such up and down motions to the knife that each sole trimmed upon the machine shall have the desired "style" regardless of the taste or skill of the operator.

Sixth. Automatic means for giving the desired bevel to the sole-edge by causing the knife-holder to move on its first axis, and thereby tilt the knife as requisite to bevel the edge more or less.

We will now fully describe the various parts above mentioned with reference to the accompanying drawings, in which—

Figure 2:
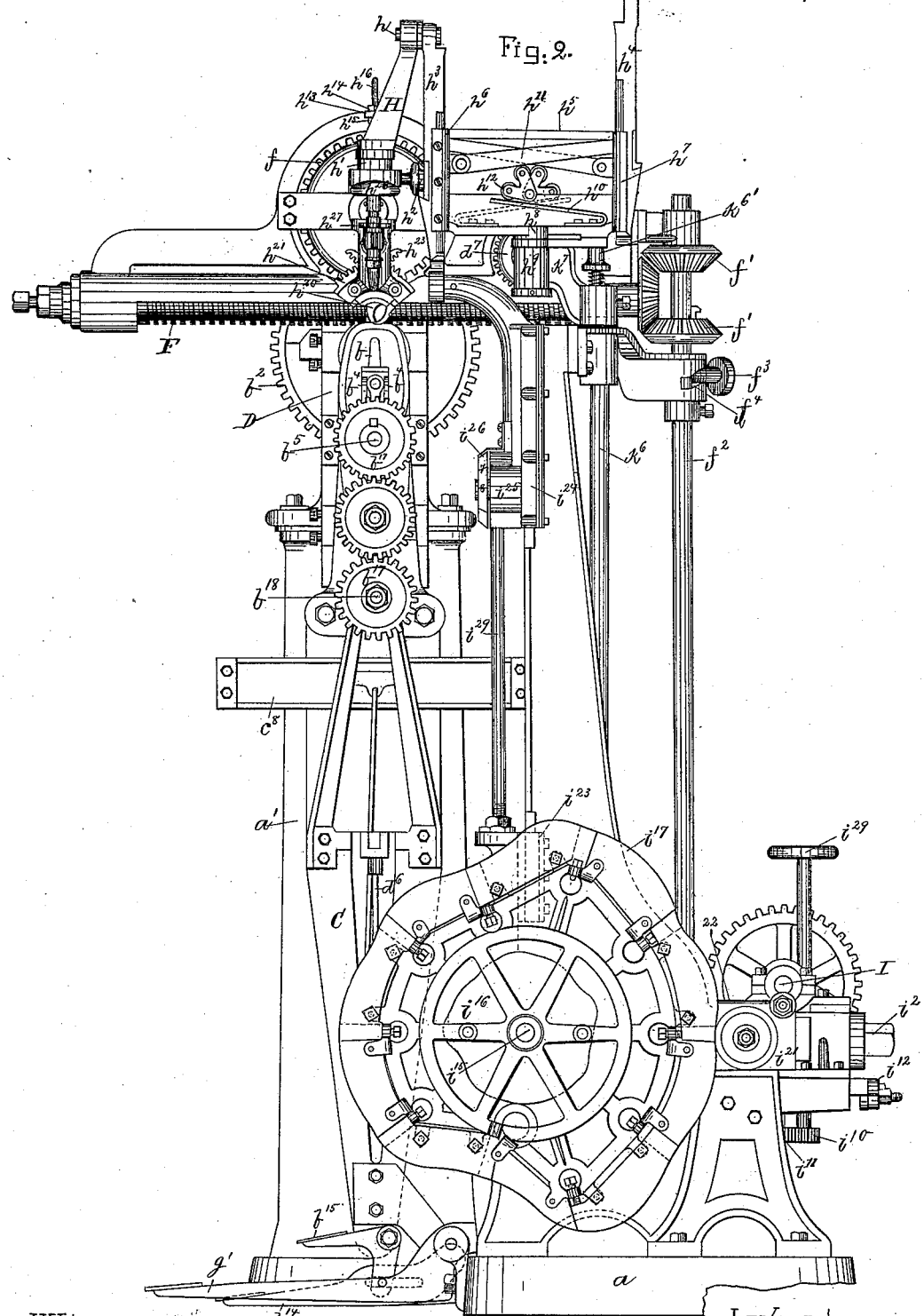
Figure 3:
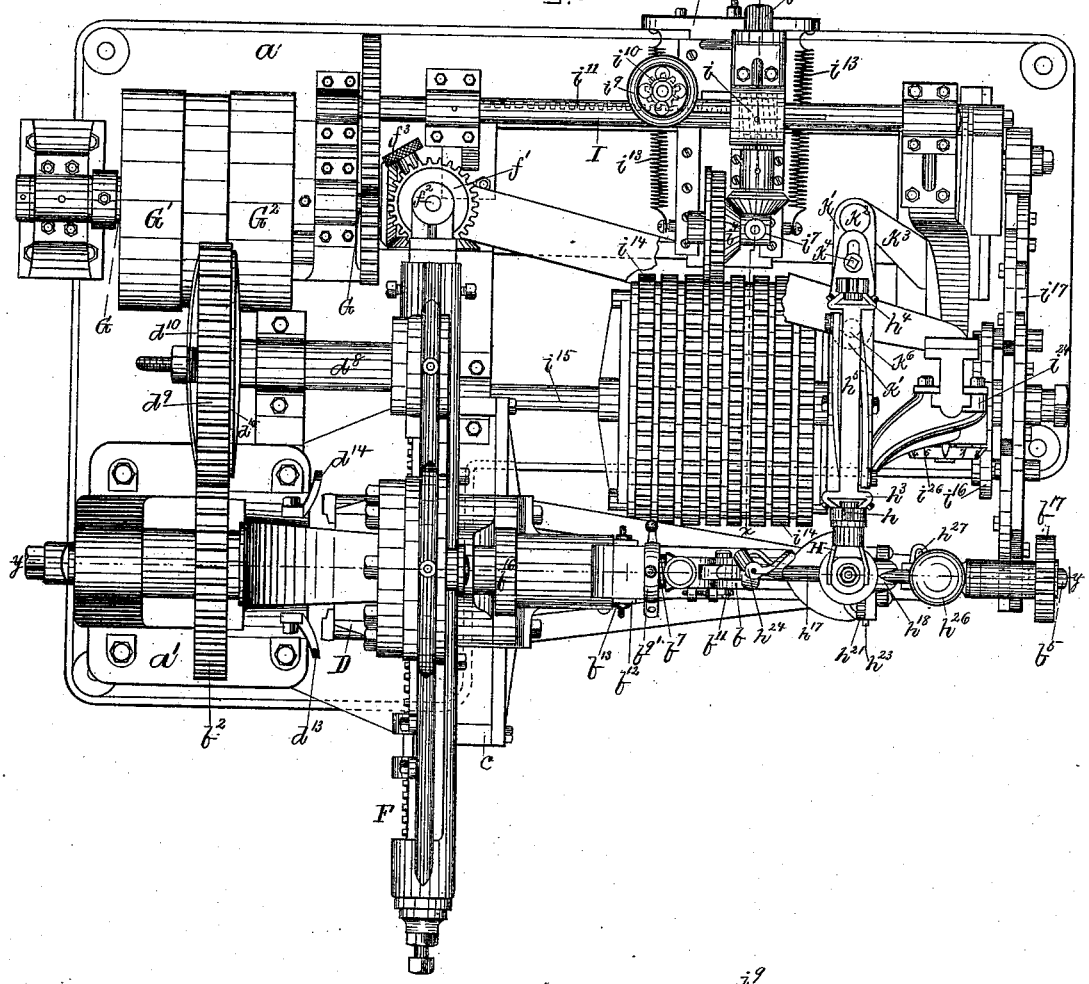
Figure 4:
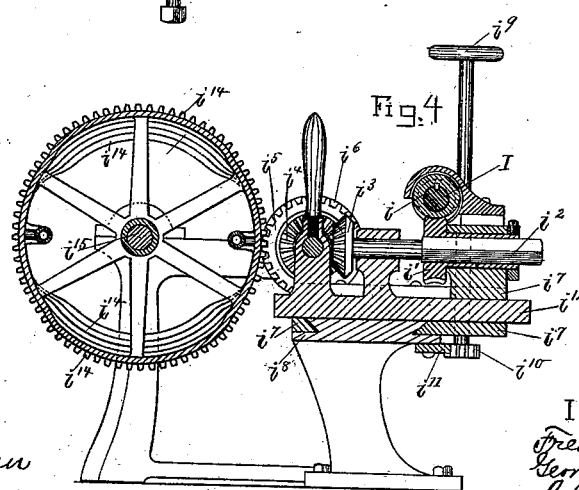

Figure 1 is a side elevation of our machine with a shoe on the jack. Fig. 2 is a front view looking from the right of Fig. 1. Fig. 3 is a plan. Fig. 4 is a transverse section on line $x\ x$ of Fig. 3. Fig. 5 is a longitudinal vertical section on line $y\ y$ of Fig. 3, the shoe being removed. Fig. 6 shows the lower end of the knife-holder support resting on a movable base, one of the cams for raising and lowering this base, the connections by which this base is moved by another cam, this latter cam being removed, but shown in position in Fig. 2. Fig. 7 is a central vertical section through the knife-holder. Fig. 8 is a cross-section on line $x\ x$ of Fig. 7. Fig. 9 is a side view of the lower part of the knife-holder. Fig. 10 is a rear view, and Figs. 11 and 11' are front views, of the device for locking and unlocking the frame on which the jack-carriage slides. Fig. 12 is a longitudinal section on line $x\ x$ of Fig. 11. Fig. 13 is a cross-section on line $y\ y$ of Fig. 11. Fig. 14 is a rear view, and Fig. 15 a front view, of the jack-carriage. Fig. 16 is a central longitudinal section through Fig. 15; Fig. 17, a cross-section on line $x\ x$, and Fig. 18 a cross-section on line $y\ y$, of Fig. 15. Fig. 19 shows the manner of mounting the sole-plates. Figs. 20 and 21 are diagrams for illustrating the positions of the knife.

The main frame, by which all the parts are supported, consists, mainly, of the base $a$ and the column $a'$. To securely hold the shoe, and to allow it to be readily clamped and unclamped, outer plates, $b\ b'$, for the sole and inner clamps, $b^2\ b^3$, are used. (See Figs. 1 and 5.) The outer plates, $b\ b'$, are shown in detail in Fig. 19, and are mounted in the ends of a lever, $b^4$, pivoted to the shaft $b^5$. One of these plates receives the shank of the shoe, instead of the heel, as heretofore. The other is shaped to conform to the fore part of the shoe-sole, and is made in several sizes. They are both pivoted to the lever $b^4$, so as to be universally adjustable. The shape of the fore-part plate, the location of the shank-plate, and the universal movements of both enable the shoe to be quickly and accurately centered. The inner clamps, $b^2\ b^3$, are mounted on a frame, $b^6$, pivoted to a shaft, $b^7$. The shaft $b^7$ is movable endwise in a sleeve fast to the stud or wrist $b^8$, but is made to turn with the sleeve by means of a spline and groove. A spring, $b^9$, tends to draw the shaft $b^7$ into the sleeve, fast to the stud $b^8$. The clamps may be adjusted in relation to the pads by means of a nut, $b^{9'}$, and the eccentrics $b^{10}\ b^{11}$, acting, respectively, on the ends of the clamps $b^2\ b^3$, as clearly shown in Fig. 5. A wedge, $b^{12}$, is placed between a collar, $b^{13}$, on the shaft $b^7$ and the end of the sleeve fast to the stud $b^8$. The wedge $b^{12}$ is connected by a rod, $b^{13'}$, to treadles $b^{14}$ and $b^{15}$, Fig. 1, so that by depressing the treadle $b^{14}$ the wedge will be drawn down and force the clamps toward the pads, and at the same time the treadle $b^{15}$ will be raised. By depressing the treadle $b^{15}$ the treadle $b^{14}$ and the wedge $b^{12}$ are both raised, and as the wedge rises the spring $b^9$ withdraws the clamps from the pads and allows these clamps, together with the shoe, to be swung out on the pivot of frame $b^6$ to a position where the shoe can be removed and another be put on. The movements of the two shafts $b^5$ and $b^8$ are made coincident and identical by means of the gears $b^{16}\ b^{17}$ and the cross-shaft $b^{18}$. This is the best form of jack known to us, and while some of its features are new with us it will of course be plain that other forms of jack may be used in machines embodying other features of our invention.

The novel features of importance in our jack are the application of the clamps to the shank and fore part of the sole, whereby we are enabled to bring the sole of each shoe to the same curve in substance; secondly, the outer pads are so shaped that the workman can readily center each shoe—that is, bring it into the proper relation with the axis of the jack; thirdly, the distribution of the pressure between the shank and fore-part pads; fourthly, the adjustability of the inner clamps to bring the sole of the shoe into proper relation with the plane of movement of the jack-carriage; fifthly, the swinging of the inner clamps, in order that the shoe may be readily put in place and removed, and, sixthly, the combination of the two members of the clamping part of the jack by means of a cross-shaft and gears, so that the axial motions of each shall be the same.

To give the endwise movements to the jack for trimming the sides and the half-round movements for trimming the toe and heel, a jack-carriage, D, (shown on a large scale in Figs. 14 to 18,) is fast to the end of the stud $b^8$ and slides on the frame $d$, fast to a shaft, $d'$, carrying a gear, $d^2$, by which it is intermittently revolved, as hereinafter described. The shaft $d'$ is supported by boxes fast to the main frame. A screw, F, journaled at its ends and supported at its middle by the worm-wheel $f$, is rotated by a gear fast to its end and one or the other of the gears $f'$ as a right or left shoe is being turned, all of the motions except that of the screw being altered for right and left shoes.

The gears $f'$ are mounted on a shaft, $f^2$, adapted to be raised or lowered to bring either gear in mesh with the gear in the screw F by means of the handle $f^3$, working in the inclined slot $f^4$. The shaft $f^2$ is driven in either direction by gearing from the shaft G, on which are mounted pulleys $G'\ G^2$. These pulleys are turned in opposite directions, one by an open belt and the other by a cross-belt. By means of a clutch operated by the treadles $g\ g'$ either pulley may be connected to the shaft G at pleasure in a manner well known for reversing motion.

The screw F meshes with the two worm-gears $d^3\ d^4$, connected by a rod, $d^5$, and sliding on ways on the carriage D. The rod $d^5$ is provided with right and left hand screw-threads and a handle, $d^6$, by which it may be turned. The pitch of the threads on the rod $d^5$ is such that one turn of the rod will move the gears $d^3$ $d^4$ exactly one thread on the screw F. By this arrangement the gears $d^3$ $d^4$ are adjusted to the varying lengths of different-sized shoes.

The screw F also drives a worm-gear, $d^7$, fast to the shaft $d^8$, on which is mounted a gear, $d^9$, that meshes with the gear $d^2$ on the shaft $d'$, to which the frame $d$ is fast. The gear $d^9$ is not fast to the shaft $d^8$, but is caused to revolve with it (when the frame $d$ is unlocked) by means of friction-plates $d^{10}$, turning with the shaft $d^8$, and against which the gear $d^9$ is pressed by spring arms and clamp-screw.

The frame $d$ (shown on a large scale in Figs. 10 to 13) is held from turning by spring-bolts $d^{11}$ $d^{12}$, which catch under lugs $d^{13}$ $d^{14}$, fast to the main frame. Both bolts will be withdrawn by turning the rock-shaft $d^{15}$, since both bolts are connected to the rock-shaft by means of the inner arm, $d^{16}$, of the rock-shaft $d^{15}$. (See Figs. 11' and 13.) The rock-shaft $d^{15}$ is turned at the proper time to withdraw the bolts (that is, when the axis of one of the gears $d^3$ or $d^4$ coincides with the axis of the shaft $d'$ of the frame $d$) by one of the dogs $d^{16'}$ or $d^{17}$ coming against its outer arm, $d^{18}$, as the carriage is moved along by the screw F and the two gears $d^3$ $d^4$, with both of which the screw F is in mesh when the carriage moves endwise. The bolts being withdrawn, leaves the frame $d$ free to turn, so that now there is not sufficient resistance to overcome the friction of the friction-plate $d^{10}$, and the gear $d^2$ is caused to revolve and carry with it the frame $d$ and the carriage D, thereby turning the carriage D one hundred and eighty degrees and bringing both gears $d^3$ $d^4$ in mesh with the screw and again locking the frame, so that the carriage will be compelled to move endwise to trim the other side of the shoe. It is evident that in thus turning the carriage on the axis of one of the worm-gears the stud $b^8$, and consequently the jack and its supporting-frame, must be lowered and raised. To effect this without shock or jar, a sliding frame, C, journaled on the wrist pin or stud $b^8$ of the jack-carriage and mounted in ways in the main frame, is pivoted at $c'$ to a slide, $c^2$, also mounted in ways on the main frame. A spring, $c^3$, is connected, by means of the levers $c^4$ and $c^5$ and the rod $c^6$, to the slide $c^2$, to which the frame C is pivoted. This counterbalancing device is best seen in Fig. 5, in which the frame C is shown at its lowest point compressed. When the frame C is raised to its highest position, the friction-roll $c^7$ is in contact with the upper curved surface of the lever $c^5$, and when the frame C begins to descend the spring $c^3$ is rapidly compressed, and thus eases the descent of the frame C at its start. Ways $c^8$, fast to the main frame, cause the frame C to move always in the same vertical plane.

The knife, hereinbefore described, must be raised and lowered to give the contour of the sole-edge. The knife is controlled by cams adapted to give the proper movements for any desired number of sizes. The machine shown is adapted for sizes from 1 to 8 of a certain style. For any other styles the only alterations necessary are changes in the contour of the cams that control the knife.

We will first describe the knife-holder. (Shown on a larger scale in Figs. 7, 8, and 9.) Side and plan views of the frame for supporting the knife-holder are shown in Figs. 2 and 3, respectively. An arm, H, has a trunnion, $h$, at its upper end and a sleeve, $h'$, at its lower end. A roller, $h^2$, is mounted on a pin secured to the sleeve $h^{11}$. By means of the trunnion $h$ and the roller $h^2$ the arm H is so mounted in either of the standards $h^3$ $h^4$ of the frame $h^5$ that while it must move with the standard it can yet have certain motions in relation to the standard. The standards $h^3$ $h^4$ slide in ways $h^6$ $h^7$, fast to the frame $h^5$, and may each support a holder carrying knives of different kinds, either of which may be brought into position by swinging the frame on its pivot $h^8$, which works in a box, $h^9$, fast to a bracket, $k^7$, secured to a rod, $k^6$, by means of which the frame $h^5$ may be partially rotated, as hereinafter described. The standard in use and the knife and holder supported by it are counterbalanced by the spring $h^{10}$, bearing on the bar $h^{11}$, (to which the standards are pivoted,) through the rollers $h^{12}$. From a cross-bar, $h^{13}$, in the arm H is suspended, by means of the adjusting-nuts $h^{14}$ $h^{15}$, a rod, $h^{16}$, which passes down through the sleeve $h'$, and is slotted at its lower end to receive the shaft $h^{17}$, mounted in the frame $h^{18}$. A stem, $h^{19}$, projects from the frame $h^{18}$ up into the sleeve $h'$, in which it fits nicely, so as to turn as a journal in its box. The knife $h^{20}$ is secured to a segmental slide, $h^{21}$, the cutting-edge of the knife being located so as to have the center of a circle of which the slide $h^{21}$ is a segment near its middle, so that as the knife is inclined by moving the slide $h^{21}$ over its guide its cutting-edge remains practically stationary. The slide $h^{21}$ is moved over a segmental guide, $h^{22}$, fast to the frame $h^{18}$, by means of the gear $h^{23}$, splined on the shaft $h^{17}$, and which meshes with teeth on the slide $h^{21}$. The shaft $h^{17}$ is turned by means of the handle $h^{24}$. An inclined block, $h^{25}$, is carried by the shaft $h^{17}$, and may be moved endwise in the slot in the lower end of the rod $h^{16}$ by means of the handle $h^{26}$, the eccentric-slot $h^{27}$, and pin $h^{28}$, so as to raise or lower the knife a limited distance, for the purpose hereinafter described.

We will now describe the means for properly raising and lowering the knife for trimming the edges of the soles and for adjusting these movements to different sizes of shoes.

If the knife were not moved up and down, the figure trimmed would have straight parallel sides and half-circular ends, and the width of this figure would depend wholly upon the distance of the knife above a straight line joining the centers of the two worm-gears $d^3$ $d^4$, while its length would depend wholly upon the distance apart of these two centers. Consequently the contour of the figure produced by the machine depends upon the variations in the distance of the knife or marker above that central line; and this part of our invention consists in obtaining these variations by means of a cam having a motion upon an axis as distinguished from a pattern which requires to have the same motions as the sole of the shoe—that is, alternately endwise and half round—the chief object of this part of our invention being to control the knife by a cam whose perimeter can be practically several times longer than that of the sole-edge, instead of by a pattern, as we have found it by actual trial impractical to use a pattern, because the pattern must be either so small as to make the rises from the shank too abrupt, or else be made too large to be practical, in view of its endwise and half-round motion, and also because it is very difficult, if not impossible, to adapt one pattern to several sizes of shoes.

A single cam can readily be made which will give the precise rise and fall of the knife to cut the pattern a figure desired, and the cam $i^{17}$ is so formed that it is exactly right for a No. 3 shoe of a certain style, a certain portion of its perimeter acting to control the knife while the jack-carriage is moving endwise, the succeeding portion so acting while the jack-carriage is making its first half-round motion, the third portion so acting while the jack-carriage again moves endwise, and the fourth and last portion so acting while the carriage makes its half-round motion to complete one revolution of the cam and one full motion of the jack-carriage and shoe. This is the principle of this part of our invention; but in its practical application, and in order that the same cam may be used for several sizes of shoe, certain devices are required. These devices are shown in Figs. 1, 2, 3, 4, and 6, and are all driven by the shaft I, (see Fig. 3,) which carries a short screw, $i$, rotated by means of a spline in the shaft I, working in a groove in the screw $i$. (See Fig. 4.) This spline-and-groove connection is to allow the screw $i$ to be shifted lengthwise on the shaft I. The screw $i$ drives a worm-wheel, $i'$, splined on the shaft $i^2$ of the miter-wheel $i^3$, so that the shaft may move endwise through the worm-wheel $i'$. The miter-wheel $i^3$ meshes with a similar wheel, $i^4$, to the shaft of which is secured the gear $i^5$, provided with a smooth-rim face-wheel, $i^6$. These are all mounted on a carriage, $i^7$, adapted to be moved on ways $i^8$, fast to the main frame, by means of the hand-wheel $i^9$, the pinion $i^{10}$, fast to the shaft of the hand-wheel, and the rack $i^{11}$, fast to the main frame. The gear $i^5$ and the miter-wheels and their shafts are mounted on a carriage, $i^{12}$, moving in ways on the carriage $i^7$. The carriage $i^{12}$ is controlled by springs $i^{13}$, fast at one end to the carriage $i^{12}$ and at the other end to the carriage $i^7$. These springs keep the face-wheel $i^6$ always against the space next to the gear with which the gear $i^5$ is in mesh. The function of this face-wheel is to prevent the teeth of the gear $i^5$ from entering too far into the teeth of the other gears, $i^{14}$, eight of which are shown in the drawings, and with any one of which the gear $i^5$ may be made to mesh by sliding the carriage $i^{12}$ back and moving the carriage $i^7$ by means of the hand-wheel $i^9$, rack $i^{11}$, and pinion $i^{10}$. The eight gears $i^{14}$ are all fast to the same shaft, $i^{15}$, to which the cams $i^{16}$ and $i^{17}$ are also fast. Both cams $i^{16}$ and $i^{17}$ impart motion to the rocker $i^{18}$, which is pivoted at its lower end to one end of a lever, $i^{19}$, the other end of which bears on the face of the cam $i^{16}$. A spring, $i^{20}$, is attached to an arm fast to the rocker $i^{18}$, and tends to pull the rocker back; but the rocker is connected to a slide, $i^{21}$, by the rod $i^{22}$, and the slide is kept against the face of the cam $i^{17}$ by means of the spring $i^{20}$. A rod, $h^{29}$, rests on the curved surface of the rocker $i^{18}$, and supports at its upper end the standard $h^3$ or $h^4$, that carries the knife-holder. This rod is caused to move vertically by the slides $i^{23}$ and $i^{24}$, moving in ways fast to the main frame. It is made in two parts, so as to be adjusted as to its length to raise or lower the knife-support to adapt the knife to the varying widths of the fore part of the soles of different-sized shoes. This adjustment is effected by means of a snail-cam, $i^{25}$, attached to and moved by the graduated disk $i^{26}$, and on which the upper part of the rod rests. By turning the disk until the mark corresponding to the number of the shoe comes under the pointer the rod will be properly adjusted to support the knife in the proper position for the width of sole corresponding to that size of shoe. The throw of this snail-cam $i^{25}$ is so graduated that the knife is raised by moving it from one member of its index to the next higher member just one-half the difference between the width of one size and the width of the next larger size, preferably at the ball of the sole.

It is evident that as the slide $i^{21}$ is moved back and forth by the cam $i^{17}$ the rocker $i^{18}$ must vibrate and raise the rod $h^{29}$ when it moves to the right and allow the rod to fall when it moves to the left, and that the up and down movements of the rod are caused by the cam $i^{17}$ alone, so long as the axis of the rocker remains stationary. It is also evident that as the lever $i^{19}$ is tilted on its fulcrum by the cam $i^{16}$ the rocker and the rod resting on it must rise or fall. The movements imparted by the combined actions of the cams $i^{16}$ and $i^{17}$ cause the knife to rise and fall to cut the proper contour of the sole-edge.

To adapt the machine to trim a number of different sizes, the cam $i^{17}$ is accurately laid out for an intermediate size, in this instance for the No. 3 size. The cam $i^{16}$ is so formed that the two cams $i^{16}$ and $i^{17}$, working together, will give the exact contour desired to a shoe of the same style but different size, in this instance a No. 6—that is to say, the raising and lowering of the knife due to cam $i^{17}$ is so raised by the action of cam $i^{16}$ as to produce a No. 6 shoe instead of a No. 3, the snail-cam $i^{25}$ being set for a No. 6 and the proper cam-gear $i^{14}$ being in mesh with the driving-pinion $i^5$. It results from this that no size is trimmed exactly right except No. 6; but the variations are so slight in the other sizes from one to eight as to be practically unimportant. For any other size the adjustment of the rod $h^{29}$, by means of the disk $i^{26}$ and the snail-cam $i^{25}$, so changes the position of the knife as to cause it to practically follow the proper contour to trim any size to which the disk $i^{26}$ may be set. The cams are so shaped as to give three times the rise or fall necessary, in order to reduce the abruptness of the curves, and consequently the rocker $i^{18}$ and its connections must be adapted to reduce the motions imparted by the cams to the rod $h^{29}$ in the same proportion.

It is evident that if a needle or marker be substituted for the knife and a suitable table be substituted for the shoe the machine may be used for marking out and grading patterns.

The knife can be readily raised and lowered by the workman by means of the handle $h^{26}$ and the inclined block $h^{25}$, before mentioned. By means of this handle and inclined block the knife may also be entirely withdrawn from the sole-edge or be advanced to trim any part of the edge where there may be, as sometimes happens, a lack of leather.

The cams must make one revolution for each size of shoe; but as the length of each size is different from the others the time in which the cams revolve must vary accordingly. To effect this a gear is provided for each size. The average gear (in this instance the fourth from the left, or for No. 4 shoe) is a true circle, having a number of teeth equal to the number of teeth in the semicircular portion of the two worm-gears shown in Fig. 15, plus twice the number of threads on the screw between the centers of the two worm-gears—that is, the number of teeth in one full circle worm-gear plus the number of threads of the screw F active on one side of the shoe and plus the same number for the other side of the shoe. It is evident that as these two worm-gears are moved to suit different sizes of shoes by means of the right and left screws on the rod $d^5$ the number of threads of the screw between them will be correspondingly greater or less, while it is also evident that the number of teeth in the worm-gears never varies. Therefore each of the gears $i^{14}$ has the same number of teeth, and is of the same diameter for the toe and heel parts of the sole; but each has a different number of teeth between these parts. To arrange these teeth the gears for sizes below No. 4 are contracted at the sides and those above No. 4 are expanded. In every gear the number of teeth for the toe and heel parts are the same, and for each side of the sole the number of teeth is always equal to the number of threads of the screw between the centers of the worm-gears. The effect of the varying number of teeth in the different gears, which are all driven by the same gear, as above described, is to cause the cams to revolve more rapidly while trimming the shorter sides of sizes smaller than No. 4 and more slowly while trimming the longer sides of sizes larger than No. 4.

To give the desired bevel to the sole-edge, the knife is tipped by means of the cam K, fast to the shaft $i^{15}$, and having a groove in its periphery, in which a pin, $k$, in the end of the lever $k'$ is inserted. The lever $k'$ is pivoted at $k^2$ to an arm, $k^3$, fast to the main frame. (See Fig. 3.) A pin, $k^4$, attached to but adjustable in the lever $k'$, passes through a slot in an arm, $k^5$, fast to the rod $k^6$. By adjusting the pin $k^4$ in the slot the movements of the lever $k'$, caused by the revolutions of the grooved cam $k$, may be imparted to partially rotate (to a greater or less extent) the rod $k^6$ through its arm $k^5$. As the rod $k^6$ is partially rotated, the bracket $k^7$, in which the frame $h^5$ is pivoted and locked by the spring-bolt $k^6$, is also partially rotated, thereby carrying the standard $h^3$ to one side. The standard $h^3$ carries with it the trunnion $h$ of the knife-holder, and since the knife is held in proper relation to the sole the knife-holder must be inclined by turning on the trunnion $h$ and rolling on the roller $h^2$, thereby inclining the knife-edge so as to give the desired bevel to the sole-edge. In other words, the knife-holder H $h'$ is tipped by the action of cam K on the rod $k^6$ as the handle of a hand-tool is tipped by the workman to cut a bevel-edge.

The operation is as follows: The shoe having been jacked, the knife is brought to the rear or heel part of the shank on that side of the shoe-edge which is uppermost, and the machine is started. The operator holds the knife-holder with his right hand on handle $h^{26}$ and his left on handle $h^{24}$, and as the shoe moves to trim down the curve of the shank from the heel toward the fore part he gradually turns shaft $h^{17}$ as required to keep the blade in the cutting-line, and also turns stem $h^{19}$ in its sleeve $h'$ sufficiently to keep the cutting-edge in proper relation crosswise with the sole-edge; and as the shoe moves to trim up the curve from the lowest part of the shank to the fore part he gradually moves the shaft $h^{17}$ the other way, and also gradually moves stem $h^{19}$ the other way. As he approaches the end of the shank proper, he suddenly turns shaft $h^{17}$ to cause the shank-knife to cut off the shaving and leave the sole-edge at the junction of the shank and fore part. The machine is then reversed and the frame $h^5$ swung around and relocked to bring the fore-part knife in position, the reverse motion of the machine being only sufficient to move the edge of the sole back about half an inch. The machine is then started again and the operator guides the fore-part knife, as above described, until he reaches the toe end of the shank on the other side of the shoe, when the fore part is guided out, as before. The machine is then reversed and the shank-knife brought into place again, when the machine is started forward again and the shank is trimmed from the toe end to the heel end, when the shank-knife is again run out, for it is not customary to trim around the heel on machines of this class. This leaves the shank-knife ready for the next shoe, and the machine is allowed to keep in motion until the last half-round motion is complete. The operator removes the trimmed shoe and jacks another, an expert operator doing this in whole or in great part after the knife is run out from the rear part of the shank and while the jack-carriage is completing its half-round motion. In case the leather of the sole is scant the operator must also turn handle $h^{26}$ to turn the knife and then turn it in the other direction to lift the knife after the scant place is found. An expert operator can also vary the style of shoe from that determined by the cams by means of this handle. A number of shoes for one foot having been trimmed, the corresponding shoes for the other foot require the cam-shaft $i^{15}$ to be turned to bring the cams into proper relation to the knife-actuating rod $h^{29}$ for those shoes, and to do this the gear $i^5$ is pushed back and the cam-shaft $i^{15}$ turned until that part of the cams $i^{16}$ and $i^{17}$ corresponding with that part of the sole-edge near the breast of the heel is brought in contact with their cam-rolls on slide $i^{21}$ and lever $i^{19}$. The shaft $f^2$ is then lowered endwise by means of the handle $f^3$, to bring the upper gear, $f'$, in mesh and the lower gear, $f'$, out of mesh with the gear on screw F.

To trim another size of shoe, the operator adjusts the snail-cam $i^{25}$ to the member, adjusts the worm-gears $d^3 d^4$ the proper distance apart for that member, and shifts the driving-gear $i^5$ into the proper one of the gears $i^{14}$. Before he adjusts the worm-gears he must of course see that only one of the worm-gears is in mesh with the screw F.

To vary the style of shoe, the segments of cam $i^{17}$ are either adjusted in or out, or new segments are substituted, with proper outlines for the desired style. The cam $i^{16}$ does not require to be changed unless the change in style be very marked, more than is usual in practice.

We are aware of Patent No. 129,824 to Samuel H. Hodges, July 23, 1872, and disclaim all that is described in it.

What we claim as our invention is—

1. Reciprocating jack-carriage D, in combination with rotary frame $d$, locked and unlocked automatically, substantially as described.

2. In combination with the jack-carriage and its jack, the frame C, substantially as described.

3. In combination with the jack-carriage and its jack, the frame C and counterbalanced frame $c^2$, substantially as described.

4. The jack, its inner shaft, $b^8$, and outer shaft, $b^5$, in combination with a cross-shaft and gears, whereby the shafts $b^8$ $b^5$ are rotated coincidently, substantially as and for the purpose set forth.

5. The jack above described, having a clamp, $b$ $b^2$, for the fore part of the sole and a clamp, $b'$ $b^3$, for the shank of the sole, substantially as described.

6. In a jack, the sole-plates $b$ $b'$, in combination with the lever $b^4$ and shaft $b^5$, substantially as described.

7. In a jack, the inner plates, $b^2$ $b^3$, each independently adjustable, substantially as described.

8. In a jack, the inner plates, $b^2$ $b^3$, in combination with frame $b^6$, pivoted to shaft $b^7$, substantially as described.

9. In combination, slide $h^{21}$, guide $h^{22}$, and knife $h^{20}$, the curves of the knife-holder and guide being arcs of circles whose center is near the cutting-edge of the knife, substantially as and for the purpose set forth.

10. In combination, slide $h^{21}$, guide $h^{22}$, frame $h^{18}$, and its stem $h^{19}$, constituting a knife-holder, substantially as described.

11. The knife mounted in a holder, in combination with a standard, $h^3$, capable of up and down motions, and frame $h^5$, capable of a motion on its axis, substantially as described.

12. In combination, a carriage having alternate sliding and semi-rotary motions, a rotating pattern-cam, a knife or marker, and actuating mechanism, substantially such as is described, for giving motion to the carriage and cam, and other mechanism, substantially such as is described, for connecting the cam with the knife or marker.

13. The mechanism herein described for giving variable motions to the pattern-cam $i^{17}$, consisting of a series of gears, $i^{14}$, and other mechanism, substantially such as described, for actuating the gears $i^{14}$, each gear $i^{14}$ having the same number of teeth for the toe as for the heel part of the sole, and a different number of teeth for the parts of the sole between the toe and heel, substantially as and for the purpose set forth.

14. In combination, cam K, tool-holder H, and mechanism, substantially such as described, for causing the holder to be inclined to bring its tool into proper relation to the varying bevels of the sole-edge, substantially as and for the purpose set forth.

FREDK. W. COY,
GEORGE A. FULLERTON.

Witnesses:
J. E. MAYNADIER,
J. R. SNOW.